Patented June 21, 1949

2,473,929

UNITED STATES PATENT OFFICE 2,473,929

POLYMERIZATION PROCESS

Wilfred K. Wilson, Springfield, Mass., assignor to Shawinigan Resins Corporation, Springfield, Mass., a corporation of Massachusetts No Drawing. Application February 18, 1946, Serial No. 648,574

11 Claims. (Cl. 260—89.1)

This invention relates to the polymerization of compounds containing a terminal ethylene group ($CH_2=C<$).

It has been suggested that vinyl compounds be polymerized in the presence of a complex catalyst comprising an iron compound and a peroxide. However, it has been discovered that complex catalysts comprising hydrogen peroxide and iron compounds lose their effectiveness rapidly so that the results obtained are not satisfactory.

It is an object of this invention to provide a new process for polymerizing compounds having terminal ethylene groups. It is a particular object of this invention to provide a method for overcoming the rapid deterioration of complex catalysts comprising hydrogen peroxide and iron compounds.

These and other objects are attained according to this invention by polymerizing a compound having a terminal ethylene group ($CH_2=C<$) in the presence of an iron compound and hydrogen peroxide in which a substantial proportion of the hydrogen peroxide is introduced into the polymerizing mixture after a substantial proportion of polymer has been formed. According to a preferred embodiment of the invention, a major proportion of the hydrogen peroxide is continuously introduced into the polymerizing mixture as the polymerization continues.

The following examples are illustrative of the present invention, but are not to be considered as limitative of the scope thereof. Where parts are given, they are parts by weight.

Example I

|  | Parts |
|---|---|
| Vinyl acetate | 53.0 |
| Water | 44.0 |
| Gum arabic | 2.5 |
| Sodium salt of dioctyl sulfo-succinate | 0.15 |
| $FeCl_3.6H_2O$ | 0.002 |
| Hydrogen peroxide | 0.02 |

About 10% of the vinyl acetate, 25% of the hydrogen peroxide and all of the remaining ingredients listed above are charged into a reaction vessel equipped with an agitator and a water-cooled return condenser. The mixture is then heated to about 75–80° C. with vigorous agitation and while continuing the agitation and the same temperature, 75% of the remaining hydrogen peroxide (in a 0.3% aqueous solution) and all of the remaining vinyl acetate are slowly added. The rate of addition of these ingredients is such as to permit the maintenance of the 75–80° C. temperature. About 2–3 hours are usually required.

After all of the vinyl acetate is added the remainder of the hydrogen peroxide (in a 0.3% aqueous solution) is introduced and the temperature of the mixture is raised to 85–90° C. After 15–30 minutes at this temperature, the mixture is cooled to room temperature.

The product comprises an emulsion of polyvinyl acetate of fine particle size having a solids content of 54–55%. The emulsion is stable over long periods of time, for example, no sludge occurs on long standing. Films may be cast from this product and after drying they are characterized by clarity, non-tackiness at ordinary temperatures and high water resistance.

The product of Example I is further characterized by the fact that part of the polyvinyl acetate contained therein is insoluble in the usual solvents for polyvinyl acetate.

Example II

Example I is repeated, except that 0.20 part of dodecyl benzene sodium sulfonate is substituted for the sodium salt of dioctyl sulpho-succinate and the amount of gum arabic is reduced to 2.0 parts.

The product comprises an emulsion of polyvinyl acetate similar to the product of Example I in stability, film forming properties and the like. However, this product was characterized by the fact that the polyvinyl acetate contained therein is soluble in the usual solvents and the viscosity of solutions of the polymer are within a readily measurable range.

Example III

Example I is repeated except that the sodium salt of dioctyl sulpho-succinate is replaced by 0.1 part of sodium disulfonate of dibutyl phenyl phenol. A stable emulsion of uniform particle size is obtained.

Example IV

Example I is repeated except that the sodium salt of dioctyl sulpho-succinate is replaced by 0.1 part sodium diisobutyl naphthalene sulfonate. A stable emulsion of uniform particle size is obtained. The product is especially characterized by freedom from clustering of the particles.

Example V

Example I is repeated except that the sodium salt of dioctyl sulpho-succinate is replaced by 0.1 part sodium alkyl naphthalene sulfonate. A stable emulsion of uniform particle size is obtained.

Example VI

Example I is repeated except that the sodium salt of dioctyl sulpho-succinate is replaced by 0.2 part of a quaternary ammonium derivative of the pyridine betaine-type made from a blend of fatty acids. A very viscous emulsion is obtained.

Example VII

Example I is repeated except that the sodium salt of dioctyl sulpho-succinate is replaced by 0.3 part aryl alkyl polyether alcohols. A stable emulsion having uniform particle size is obtained.

The following examples illustrate the formation of stable emulsions by the process of the invention in which various types of protective colloids are employed.

Example VIII

Example I is repeated except that the gum arabic is replaced by 1 part gum tragacanth. A stable viscous emulsion is obtained.

Example IX

Example I is repeated except that hydroxy ethyl cellulose is used in place of gum arabic in the same quantity. The product is similar to that obtained in Example I.

Example X

Example I is repeated except that the gum arabic is replaced by 2.0 parts of sodium carboxymethyl-cellulose. A stable emulsion similar in characteristics to the product described in Example I is obtained.

According to another embodiment of the invention, all of the vinyl acetate or other polymerizable compound is charged to the reaction vessel and only the addition of the hydrogen peroxide is delayed. The following example illustrates this procedure.

Example XI

| | Parts |
|---|---|
| Vinyl acetate | 53.0 |
| Water | 44.0 |
| Gum arabic | 2.5 |
| Sodium salt of dicotyl sulpho-succinate | 0.15 |
| $FeCl_3.6H_2O$ | 0.001 |
| Hydrogen peroxide | 0.005 |

About 10% of the hydrogen peroxide and all of the remaining ingredients listed above are charged into a reaction vessel equipped with an agitator and water-cooled return condenser. The mixture is then heated to 75–80° C. with stirring and the remaining hydrogen peroxide slowly added over a period of about 3 hours while maintaining the 75–80° C. temperature.

After all of the hydrogen peroxide is added, the temperature of the mixture is raised to 85–90° C. and after about 15–30 minutes at this temperature, the product is cooled to room temperature.

The product comprises an emulsion of polyvinyl acetate having a solids content of about 54–55%. The emulsion possesses valuable characteristics, but is somewhat inferior to emulsions in the preparation of which the vinyl acetate, as well as the hydrogen peroxide, is slowly added, such as the product in Example I. For example, the emulsion exhibits a greater spread in particle size than the product in Example I so that the exceptional stability of the product in Example I is not obtained.

In contrast to the results obtained according to the present invention as illustrated by the examples, when all of the hydrogen peroxide is introduced initially the reaction mixture after the same period of heating contains a large proportion of unpolymerized vinyl acetate and the polymer varies widely in particle size. Furthermore, results equivalent to those obtained by the process of this invention are not obtained by simply adding an excess of hydrogen peroxide initially. Thus, the process of the invention permits a ready and effectual control of the course of the polymerization and of the nature of the product obtained coupled with efficient use of the components of the catalyst.

While the examples illustrate the process of the invention as applied to polymerization of emulsions, it is to be understood that the process is applicable to polymerization of solutions of vinyl compounds or to polymerization in the absence of solvents or dispersion media. However, it is apparent that the delayed addition of hydrogen peroxide is of limited applicability as regards mass polymerization of monomeric materials which solidify on polymerzation. When the polymerization is carried out in solution, the nature and proportions of solvent are such as to form a mutual solution of polymerizable compound and the catalyst. For example, in the case of vinyl acetate, methanol, ethanol, acetone, ethyl acetate, benzene, toluene and the like are suitable solvents.

Numerous other variations may be introduced into the process of the invention as illustrated by the specific examples. For example, other polymerizing temperatures may be used, the exact temperature depending in part on the nature of the polymer desired. However, it has been noted that the activity of complex catalysts comprising iron compounds and hydrogen peroxide shows a sharp increase when the temperature is raised above about 70° C.

The process of the present invention is applicable to polymerizable compounds generally which contain a terminal ethylene group ($CH_2=C<$). Thus, various vinyl or vinylidene compounds may be used, as for example, vinyl esters of organic acids, such as vinyl acetate, vinyl propionate, vinyl butyrate; vinyl halides, such as vinyl chloride and vinyl bromide; vinylidene halides, such as vinylidene chloride, vinylidene bromide; olefine benzenes such as styrene, alpha-methyl styrene, ortho chlorostyrene, para chlorostyrene, and various polymerizable polychlorostyrenes; hydrocarbons, such as iso-butene and 1,3-butadiene; vinyl ketones, such as methyl vinyl ketone; vinyl ethers, such as vinyl butyl ether; vinyl or substituted vinyl group-containing acids and esters thereof such as acrylic acid, methacrylic acid, methyl acrylate, ethyl acrylate, methyl methacrylate and ethylene glycol dimethacrylate; esters obtainable by reacting vinyl or substituted vinyl group-containing alcohols with carboxylic acids such as allyl acrylates, diallyl maleate, diallyl oxalate, diallyl phthalate, allyl acetate, allyl chloroacetate and allyl crotonate. Mixtures of two or more of the above or other polymerizable compounds may be used.

Usually the polymerization in aqueous emulsion is carried out at a pH of 1–7 and, preferably, within the range 4–6. When it is desired to lower the initial pH of the polymerizing mixture, various acids may be used for this purpose, such as formic acid, acetic acid, chloracetic acid, benzene sulfonic acid, toluene sulfonic acid, nitric acid, hydrochloric acid, sulfuric acid and the like.

The complex catalyst may be made with various iron compounds which initially may be either in the form of the ferrous or ferric compounds. Suitable iron compounds are the nitrates, chlorides, sulfates, acetates, sulfonic acid salts, e. g., the iron salts of benzene sulfonic acid, toluene sulfonic acid and the like.

When a wetting agent is used to expedite the emulsification of the unsaturated material, this may be one or more of the well-known wetting agents, for example, anionic, cationic or nonionic wetting agents, such as the alkali metal, ammonium and amine salts of long chain fatty acids, for example, sodium oleate, sodium palmitate, potassium stearate, Marseilles soap, diethanol amine laurate; alkali metal sulfonates of aliphatic or alkyl-aromatic hydrocarbons of high molecular weight, such as the alkyl naphthalene sulfonic acids, for example, isobutyl naphthalene sulfonic acid; sodium lauryl sulfate; salts of sulfonates of alkyl esters of dicarboxylic acids, for example, the sodium salt of dioctyl sulfo-succinate, sodium diisobutyl naphthalene sulfonate, dodecyl benzene sodium sulfonate, decyl benzene sodium sulfonate, sodium disulfonate of dibutyl phenyl phenol, sodium sulfonate of higher synthetic secondary alcohols, sodium alkyl naphthalene sulfonate, and aryl alkyl polyether alcohols.

It is frequently desirable, as illustrated by the examples, to include a lyophilic colloid in making emulsions according to the process of this invention. Examples of suitable colloids are polyvinyl alcohol, partially hydrolyzed polyvinyl acetate, for example, polyvinyl alcohol, containing up to 10% acetate groups. These colloids are especially suitable when they are made from polyvinyl acetate having a viscosity of over 7 centipoises as determined in a one-molar solution at 20° C. Other suitable colloids are soluble starch, soluble starch degradation products, the methyl ether of cellulose, water-soluble glycol cellulose, gum tragacanth, gum acacia, sodium alginate, agar-agar, gum tragon, gum arabic, glue, gelatine, hydroxy ethyl cellulose, sodium carboxy methyl cellulose, and the like.

The amounts of hydrogen peroxide and the iron compounds used may be substantially varied— the particular amounts employed in any particular case depending on the nature of the reaction conditions, e. g., solution or emulsion polymerization, degree of dilution or dispersion, viscosity desired in the polymer, etc. In general, small amounts are sufficient, from 0.0002 to 0.004 part of combined iron and from 0.01 to 0.20 part of hydrogen peroxide are used for every 100 parts of the dispersion medium.

According to a preferred embodiment of the invention, vinyl acetate is polymerized in emulsion form in the presence of a dispersing agent comprising both a wetting agent and a hydrophilic protective colloid as illustrated by the examples. Only small amounts of these materials are generally desirable in order not to deleteriously affect the properties of the product. On the other hand, a certain minimum is necessary for proper stability of the emulsion both during and after polymerization. Usually 0.01% to 1.0% wetting agent and 0.5% to 5.0% protective colloid based on the aqueous dispersion medium are found to produce especially valuable products.

In making aqueous emulsions of polymerized vinyl compounds according to the process of the invention, the ratio of water to polymerizable compound may be varied substantially. Usually it is desirable that the weight ratio of water to polymerizable compound does not exceed 90:10, since the yield of polymer per unit volume of the reaction vessel becomes unduly small. Generally, much lower amounts of water are used, e. g., weight ratios of water to polymerizable compound of between 60:40 and 40:60. Usually, the weight ratio of water to polymerizable compound is not lower than 30:70 since the viscosity of the polymerizing mixture becomes too high to permit adequate agitation.

The proportion of the hydrogen peroxide that is added after the polymerization has been initiated may be varied substantially, e. g. 10–90%. However, it is preferred that the addition of a major proportion of the hydrogen peroxide be delayed, e. g., more than 50%, and preferably at least 70%. If desired, the addition of all of the hydrogen peroxide may be delayed until the mixture has reached the desired reaction temperature. However, a somewhat smoother reaction generally results if 10–30% of the hydrogen peroxide is added initially. Also, according to a preferred procedure when the polymerizable compound is slowly added, the addition of from 5–15% of the hydrogen peroxide is delayed until all of the polymerizable compound has been added.

When the vinyl compound and the hydrogen peroxide are added together, either continuously or by successive additions as the polymerization continues, the ratio of the two ingredients in each addition to the charge is preferably kept constant, e. g., by premixing the hydrogen peroxide and the vinyl compound and adding portions of the mixture.

When all of the vinyl compound is added initially, the hydrogen peroxide, to be added as the polymerization continues, is preferably added at a uniform rate, either continuously or in successive additions.

When gaseous materials such as vinyl chloride are polymerized, the system is kept under sufficient pressure to keep the vinyl chloride or other gaseous material in the liquid state.

Various types of coagulating agents may be used when it is desired to recover the polymerized vinyl compound per se instead of using the product in the form of an emulsion. For example, polyvinyl acetate may be coagulated from the emulsion by salting out, addition of strong acids, e. g., hydrochloric acid, etc. The coagulated product may then be washed with water to remove traces of water-soluble materials and after drying, used in the customary manner.

It is to be understood that the above description is given by way of illustration only, and not of limitation, and that deviations are possible within the spirit of the invention.

What is claimed is:

1. In a batch process for polymerizing a polymerizable compound having a $CH_2=C<$ group in an aqueous emulsion containing, as a catalyst, 0.01–0.2 part of hydrogen peroxide and such an amount of a water-soluble iron salt as to contain 0.0002–0.004 part of combined iron for every 100 parts of water, the steps which comprise adding all of the iron salt, but only a portion of the hydrogen peroxide initially and adding the remainder of the hydrogen peroxide after a substantial proportion of the polymerizable compound has been polymerized, 10–70 parts of the polymerizable compound being polymerized for every 90–30 parts of water.

2. A process as defined in claim 1 in which a minor proportion of the peroxide is added initially, and the remainder is added in successive proportions as the polymerization continues.

3. A process as defined in claim 2 in which the polymerizable compound is a vinyl ester of a lower aliphatic acid.

4. A process as defined in claim 3 in which the polymerizable compound is vinyl acetate.

5. A process as defined in claim 1 in which the polymerizable compound is a vinyl ester of a lower aliphatic acid.

6. In a batch process for polymerizing vinyl acetate in an aqueous emulsion containing, as a catalyst, 0.01–0.2 part of hydrogen peroxide and such an amount of a water-soluble iron salt as to contain 0.0002–0.004 part of combined iron for every 100 parts of water, the steps which comprise adding all of the iron salt, but only a portion of the hydrogen peroxide initially, emulsifying the vinyl acetate with the water in the presence of a dispersing agent, heating the emulsion to polymerize the vinyl acetate and adding the remainder of the hydrogen peroxide in successive proportions throughout the polymerization, 10–70 parts of vinyl acetate being polymerized for every 90–30 parts of water.

7. A process as defined in claim 6 in which the dispersing agent comprises a wetting agent and a protective colloid.

8. A process as defined in claim 6 in which the dispersing agent comprises the sodium salt of dioctyl sulpho-succinate and gum arabic.

9. A process as defined in claim 6 in which the dispersing agent comprises dodecyl benzene sodium sulfonate and gum arabic.

10. A process as defined in claim 6 in which the hydrogen peroxide and the vinyl acetate are continuously added to a heated aqueous solution of the dispersing agent and the water-soluble iron salt in the water, the vinyl acetate being added at substantially the rate at which it is polymerized.

11. A process as defined in claim 10 in which the dispersing agent comprises the sodium salt of dioctyl sulpho-succinate and gum arabic.

WILFRED K. WILSON.

REFERENCES CITED

The following references are of record in the file of this patent:

UNITED STATES PATENTS

| Number | Name | Date |
|---|---|---|
| 1,896,491 | Luther | Feb. 7, 1933 |
| 2,310,780 | Hanford et al. | Feb. 9, 1943 |
| 2,333,633 | Britton et al. | Nov. 19, 1943 |
| 2,380,473 | Stewart | July 31, 1945 |
| 2,388,600 | Collins | Nov. 6, 1945 |
| 2,339,184 | Neher | Jan. 11, 1944 |

OTHER REFERENCES

Serial No. 337,552, Berg (A. P. C.), published Apr. 20, 1943.